United States Patent
Bush et al.

(10) Patent No.: US 6,804,826 B1
(45) Date of Patent: Oct. 12, 2004

(54) RADIO FREQUENCY LEAKAGE DETECTION SYSTEM FOR CATV SYSTEM

(75) Inventors: Terry W. Bush, Greenwood, IN (US); Gregg S. Rodgers, Noblesville, IN (US)

(73) Assignee: Trilithic, Inc., Indianapolis, IN (US)

( * ) Notice: Subject to any disclaimer, the term of this patent is extended or adjusted under 35 U.S.C. 154(b) by 994 days.

(21) Appl. No.: 09/619,094

(22) Filed: Jul. 19, 2000

Related U.S. Application Data

(60) Provisional application No. 60/170,267, filed on Dec. 11, 1999, and provisional application No. 60/145,867, filed on Jul. 28, 1999.

(51) Int. Cl.[7] .......................... H04N 7/173; H04N 7/16; H04B 17/00
(52) U.S. Cl. ...................... 725/107; 725/17; 455/67.13; 455/67.14; 455/67.15
(58) Field of Search ................................ 725/143, 144, 725/148, 15, 17, 107, 124, 125; 348/192, 193, 180; 455/67.7, 67.13, 67.14, 67.15, 226.1, 226.2, 226.3

(56) References Cited

U.S. PATENT DOCUMENTS

| | | | |
|---|---|---|---|
| 2,291,533 A | | 7/1942 | Cummings |
| 3,155,897 A | | 11/1964 | Rice |
| 3,345,560 A | | 10/1967 | Perkins |
| 3,368,031 A | | 2/1968 | Eisele |
| 3,631,346 A | * | 12/1971 | Riggs ...................... 324/76.14 |
| 3,684,823 A | | 8/1972 | McVoy |
| 3,711,767 A | | 1/1973 | Campbell, Jr. et al. |
| 3,882,287 A | | 5/1975 | Simmonds |
| 4,072,899 A | | 2/1978 | Shimp |
| 4,237,486 A | | 12/1980 | Shimp |
| 4,413,229 A | | 11/1983 | Grant |
| 4,491,968 A | | 1/1985 | Shimp et al. |
| 4,520,508 A | | 5/1985 | Reichert, Jr. |
| 4,609,866 A | | 9/1986 | Loftness |

(List continued on next page.)

OTHER PUBLICATIONS

Archer S. Taylor, "Characterization of Cable TV Networks as the Transmission Media for Data", IEEE Journal on Selected Areas in Communications, vol. SAC–3, No. 2, Mar. 1985 pp. 255–265.

*Primary Examiner*—Hai Tran
*Assistant Examiner*—Dominic Saltarelli
(74) *Attorney, Agent, or Firm*—Barnes & Thornburg

(57) ABSTRACT

A communication circuit carries at least one signal including synchronizing intervals by which output of the signal by first apparatus coupled to the communication circuit is to be synchronized. A communication method includes selecting and modulating at least a portion of the duration of at least some of the synchronizing intervals. A modulator is provided for selecting and modulating at least a portion of the duration of at least some of the synchronizing intervals. Another communication circuit carries at least a first signal including frequencies in at least a first frequency band. A method of determining whether the first signal is escaping from the circuit includes transporting along the circuit apparatus adapted for receiving the first signal, detecting whether a received signal includes frequencies in the first frequency band, and producing an indication that the received signal includes frequencies in the first frequency band. A detector is provided for transporting along the circuit for determining whether the first signal is escaping from the circuit. The detector is adapted for receiving the first signal, detecting whether a received signal includes frequencies in the first frequency band, and producing an indication that the received signal includes frequencies in the first frequency band.

6 Claims, 8 Drawing Sheets

U.S. PATENT DOCUMENTS

| | | |
|---|---|---|
| 4,670,789 A | 6/1987 | Plume |
| 4,700,222 A | 10/1987 | Large et al. |
| 4,731,586 A | 3/1988 | Perkins |
| 4,775,839 A | 10/1988 | Kosina et al. |
| 4,810,961 A | 3/1989 | Takahashi et al. |
| 4,814,694 A | 3/1989 | Takahashi et al. |
| 4,962,358 A | 10/1990 | Svetanoff |
| 5,210,497 A | 5/1993 | Regini |
| 5,210,498 A | 5/1993 | Paananen |
| 5,294,937 A | 3/1994 | Ostteen et al. |
| 5,321,089 A | 6/1994 | Cadorniga et al. |
| 5,321,849 A | 6/1994 | Lemson |
| 5,465,112 A | 11/1995 | Nakao |
| 5,493,210 A | 2/1996 | Orndorff et al. |
| 5,585,842 A | 12/1996 | Chappell et al. |
| 5,608,428 A | 3/1997 | Bush |
| 5,917,597 A | 6/1999 | Hall et al. |
| 6,005,518 A * | 12/1999 | Kallina ........................ 342/459 |
| 6,018,358 A | 1/2000 | Bush |
| 6,021,269 A * | 2/2000 | Lewis ............................ 703/5 |
| 6,118,975 A | 9/2000 | Bowyer et al. |
| 6,611,150 B1 * | 8/2003 | Stevens ...................... 324/613 |

* cited by examiner

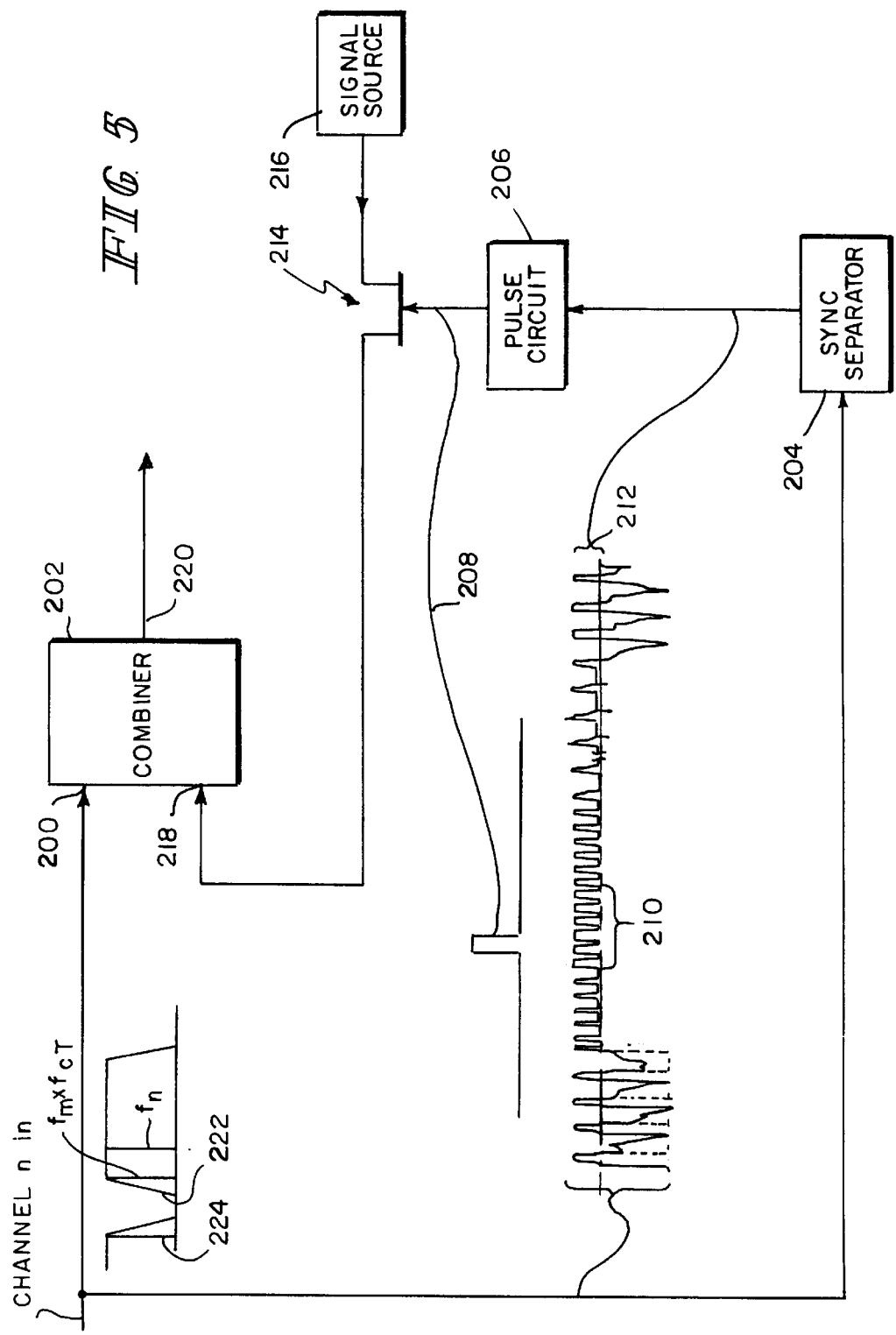

RADIO FREQUENCY LEAKAGE DETECTION SYSTEM FOR CATV SYSTEM

CROSS REFERENCE TO RELATED APPLICATIONS

This application claims the benefit of the filing dates of U.S. Ser. No. 60/145,867 filed Jul. 28, 1999, and U.S. Ser. No. 60/170,267 filed Dec. 11, 1999.

FIELD OF THE INVENTION

This invention relates to the detection of RF leakage from communication circuits. It is disclosed in the context of an RF leakage detection system for a CATV system, but is believed to be useful in other applications as well.

BACKGROUND OF THE INVENTION

Techniques for the detection of RF leakage from CATV systems are known. There are, for example, the systems described in U.S. Pat. Nos. 5,608,428; 5,294,937; 4,520,508; 4,491,968; 4,413,229; 4,237,486; 4,072,899; 3,711,767. There are also the systems described in U.S. Pat. Nos. 5,585,842; 5,493,210; 5,321,089; 5,210,498; 5,210,497; 4,962,358; 4,814,694; 4,810,961; 4,775,839; 4,731,586; 4,670,789; 4,609,866; 3,882,287; 3,684,823; 3,368,031; 3,345,560; 3,155,897; and, 2,291,533. There is also the disclosure of U.S. Ser. No. 08/690,122, filed Jul. 31, 1996. There is also the disclosure of Archer S. Taylor, *Characterization of Cable TV Networks as the Transmission Media for Data*, IEEE Journal on Selected Areas in Communications, vol. SAC-3, no. 2, March 1985, pp. 255–265. The disclosures of all of these references are hereby incorporated herein by reference. This listing is not intended as a representation that the disclosures listed above are pertinent, or that a thorough search of the prior art has been conducted, or that no more pertinent disclosures than those listed above exist, and no such representations should be inferred.

DISCLOSURE OF THE INVENTION

According to a first aspect of the invention, a communication circuit carries at least one signal including synchronizing intervals by which output of the signal by first apparatus coupled to the communication circuit is to be synchronized. A communication method includes selecting and modulating at least a portion of the duration of at least some of the synchronizing intervals.

Illustratively according to this aspect of the invention, the method further includes transporting along the circuit second apparatus adapted for receiving the signal, detecting the modulation, and producing an indication that the modulation has been detected for determining whether the signal is escaping from the circuit.

Further illustratively according to this aspect of the invention, selecting and modulating at least a portion of the duration of at least some of the synchronizing intervals includes modulating the amplitude of at least a portion of the duration of at least some of the synchronizing intervals.

Additionally illustratively according to this aspect of the invention, selecting and modulating at least a portion of the duration of at least some of the synchronizing intervals includes sinusoidally modulating at least a portion of the duration of at least some of the synchronizing intervals.

Illustratively according to this aspect of the invention, selecting and modulating at least a portion of the duration of at least some of the synchronizing intervals includes generating a first sinusoid having a first frequency, generating a second sinusoid having a second frequency, frequency modulating the first sinusoid with the second sinusoid to produce a frequency modulated signal, and modulating at least a portion of the duration of at least some of the synchronizing intervals with the frequency modulated signal.

Further illustratively according to this aspect of the invention, detecting the modulation includes detecting the frequency modulated signal.

Alternatively illustratively according to this aspect of the invention, detecting the modulation includes detecting the second sinusoid.

Alternatively illustratively according to this aspect of the invention, detecting the modulation includes detecting the first sinusoid.

Additionally illustratively according to this aspect of the invention, selecting and modulating at least a portion of the duration of at least some of the synchronizing intervals includes modulating the amplitude of at least a portion of the duration of a relatively constant portion of the synchronizing intervals.

Illustratively according to this aspect of the invention, selecting and modulating at least a portion of the duration of at least some of the synchronizing intervals includes sinusoidally modulating at least a portion of the duration of substantially all of the synchronizing intervals.

Further illustratively according to this aspect of the invention, selecting and modulating at least a portion of the duration of at least some of the synchronizing intervals includes modulating the amplitude of substantially all of the duration of at least a portion of the synchronizing intervals.

Additionally illustratively according to this aspect of the invention, selecting and modulating at least a portion of the duration of at least some of the synchronizing intervals includes sinusoidally modulating substantially all of the duration of at least a portion of the synchronizing intervals.

According to another aspect of the invention, a communication circuit carries at least one signal including synchronizing intervals by which output of the signal by first apparatus coupled to the communication circuit is to be synchronized. A modulator is provided for selecting and modulating at least a portion of the duration of at least some of the synchronizing intervals.

Illustratively according to this aspect of the invention, the apparatus further includes a detector for transportation along the circuit. The detector is adapted for receiving the signal, detecting the modulation, and producing an indication that the modulation has been detected for determining whether the signal is escaping from the circuit.

Further illustratively according to this aspect of the invention, the modulator includes a modulator for selecting and modulating the amplitude of at least a portion of the duration of at least some of the synchronizing intervals.

Additionally illustratively according to this aspect of the invention, the modulator includes a modulator for sinusoidally modulating at least a portion of the duration of at least some of the synchronizing intervals.

Illustratively according to this aspect of the invention, the modulator includes a modulator for generating a first sinusoid having a first frequency, generating a second sinusoid having a second frequency, frequency modulating the first sinusoid with the second sinusoid to produce a frequency modulated signal, and modulating at least a portion of the duration of at least some of the synchronizing intervals with the frequency modulated signal.

Further illustratively according to this aspect of the invention, the detector includes a detector for detecting the frequency modulated signal.

Alternatively illustratively according to this aspect of the invention, the detector includes a detector for detecting the second sinusoid.

Alternatively illustratively according to this aspect of the invention, the detector includes a detector for detecting the first sinusoid.

Additionally illustratively according to this aspect of the invention, the modulator includes a modulator for modulating the amplitude of at least a portion of the duration of a relatively constant portion of the synchronizing intervals.

Illustratively according to this aspect of the invention, the modulator includes a modulator for sinusoidally modulating at least a portion of the duration of substantially all of the synchronizing intervals.

Further illustratively according to this aspect of the invention, the modulator includes a modulator for modulating the amplitude of substantially all of the duration of at least a portion of the synchronizing intervals.

Additionally illustratively according to this aspect of the invention, the modulator includes a modulator for sinusoidally modulating substantially all of the duration of at least a portion of the synchronizing intervals.

According to yet another aspect of the invention, a communication circuit carries at least a first signal including frequencies in at least a first frequency band. A method of determining whether the first signal is escaping from the circuit includes transporting along the circuit apparatus adapted for receiving the first signal, detecting whether a received signal includes frequencies in the first frequency band, and producing an indication that the received signal includes frequencies in the first frequency band.

Illustratively according to this aspect of the invention, transporting apparatus adapted for receiving the first signal includes transporting apparatus through an environment including at least a second signal including frequencies in at least a second frequency band not including frequencies in the first frequency band.

Further illustratively according to this aspect of the invention, the method includes detecting whether a received signal includes frequencies in the second frequency band.

Additionally illustratively according to this aspect of the invention, the method includes comparing the magnitude of received frequencies in the first frequency band to the magnitude of received frequencies in the second frequency band. Producing an indication that the received signal includes frequencies in the first frequency band includes producing an indication of the relationship of the magnitude of received frequencies in the first frequency band to the magnitude of received frequencies in the second frequency band.

Illustratively according to this aspect of the invention, comparing the magnitude of received frequencies in the first frequency band to the magnitude of received frequencies in the second frequency band and producing an indication of the relationship of the magnitude of received frequencies in the first frequency band to the magnitude of received frequencies in the second frequency band together include comparing the magnitude of received frequencies in the first frequency band to a first desired threshold and producing a third signal based upon this comparison, comparing the magnitude of received frequencies in the second frequency band to a second desired threshold and producing a fourth signal based upon this comparison, and combining the third and fourth signals to produce the indication of the relationship of the magnitude of received frequencies in the first frequency band to the magnitude of received frequencies in the second frequency band.

According to yet another aspect of the invention, a detector is provided for transporting along the circuit for determining whether the first signal is escaping from the circuit. The detector is adapted for receiving the first signal, detecting whether a received signal includes frequencies in the first frequency band, and producing an indication that the received signal includes frequencies in the first frequency band.

Illustratively according to this aspect of the invention, the detector is adapted for receiving a second signal including frequencies in at least a second frequency band not including frequencies in the first frequency band.

Illustratively according to this aspect of the invention, the detector is further adapted for comparing the magnitude of received frequencies in the first frequency band to the magnitude of received frequencies in the second frequency band, and producing an indication of the relationship of the magnitude of received frequencies in the first frequency band to the magnitude of received frequencies in the second frequency.

Illustratively according to this aspect of the invention, the detector compares the magnitude of received frequencies in the first frequency band to the magnitude of received frequencies in the second frequency band and produces an indication of the relationship of the magnitude of received frequencies in the first frequency band to the magnitude of received frequencies in the second frequency band by comparing the magnitude of received frequencies in the first frequency band to a first desired threshold and producing a third signal based upon this comparison, comparing the magnitude of received frequencies in the second frequency band to a second desired threshold and producing a fourth signal based upon this comparison, and combining the third and fourth signals to produce the indication of the relationship of the magnitude of received frequencies in the first frequency band to the magnitude of received frequencies in the second frequency band.

BRIEF DESCRIPTION OF THE DRAWINGS

The invention may best be understood by referring to the following detailed description and accompanying drawings which illustrate the invention. In the drawings:

FIG. 5 illustrates a partly block and partly schematic diagram of a detail of another system constructed according to the invention, and waveforms useful in understanding the operation of the detail;

DETAILED DESCRIPTIONS OF ILLUSTRATIVE EMBODIMENTS

Figure 1:
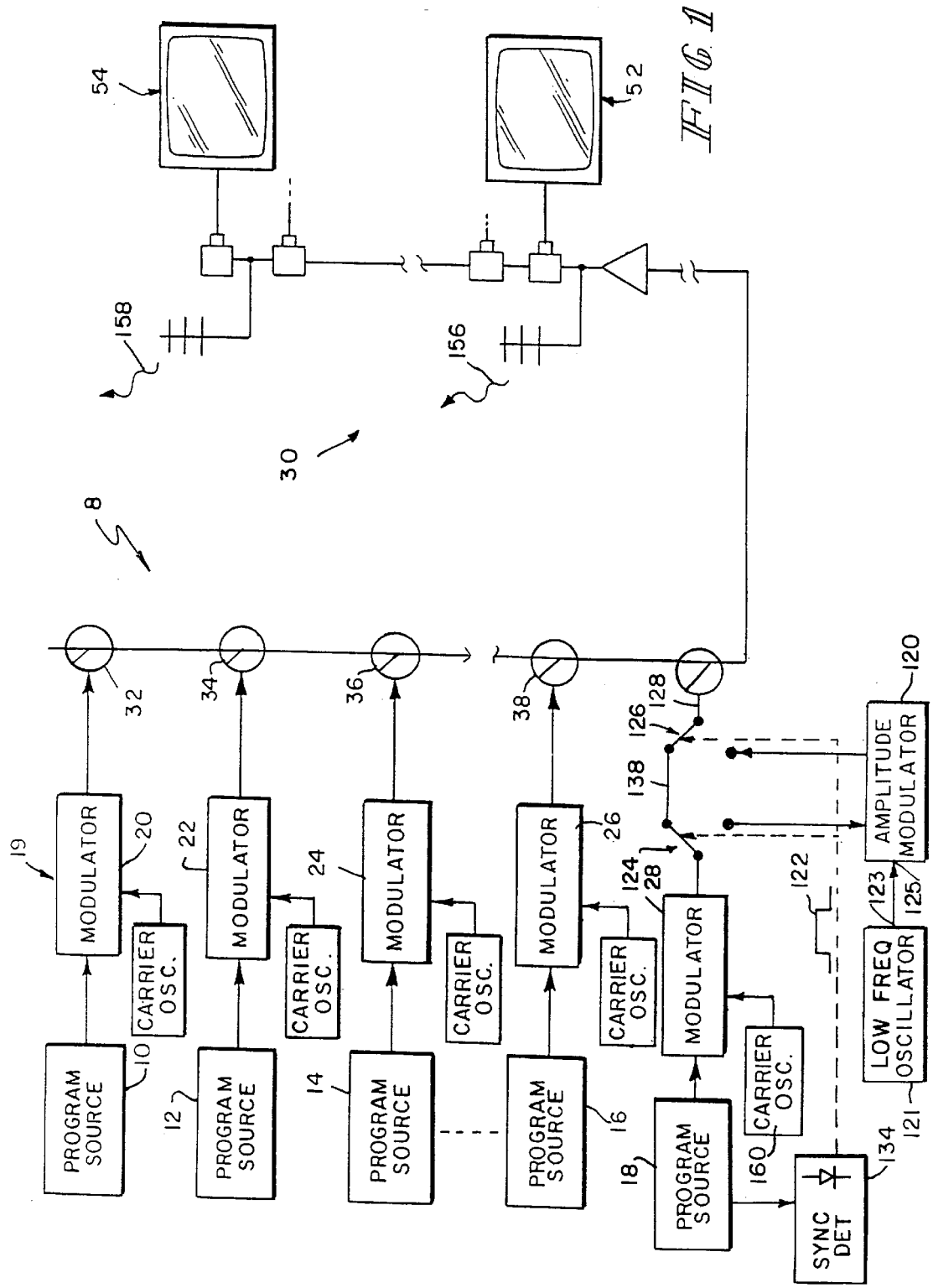
FIG. 1 illustrates a block diagram of a system incorporating the invention.

Turning now to the drawings, it is known to place a slowly varying modulation, sometimes referred to as a "tag," on a CATV channel's video carrier or on an active CATV channel's video signal with the intent of detecting the tag, in order to determine whether there is leakage of the detected channel, and hence, RF radiation generally, from the CATV system that is carrying the channel. Modulation frequencies proposed for such tags are in the very low frequency range, for example, 3 Hz to 35 Hz, that television receivers' AGC circuits are designed to correct such modulation out of the received video. In this way, the subscribers who are viewing the tagged channel on their receivers are unaware that the channel is tagged, because their own receivers have removed the tag modulation before the video signal on the tagged channel is processed.

A problem arises with certain set top terminals (STTs) which do not have AGC circuits with bandwidths sufficient to remove tags in the desired frequency ranges. Such STTs have, for example, narrower AGC bandwidths in, for example, the 3 Hz to <7 Hz range, so that if a CATV system tags a channel with, for example, a 20 Hz tag, the 20 Hz modulation is not corrected out of the signal processed by the STT. As a result, the 20 Hz modulation remains in the video signal which is supplied to the receiver of a subscriber who is provided with such an STT. Such modulation can appear, for example, as an annoying 20 Hz modulation of the luminance of the picture being viewed by the subscriber. This modulation can be sufficiently annoying to render the tagged channel incapable of being viewed, and thus useless.

In certain embodiments of the invention, tag modulation appears only in a part of the video which is not displayed on subscribers' receivers, such as, for example, in the vertical blanking interval. It is known to place other signals in the vertical blanking interval. However, it is not believed to be known to place such a low frequency tag signal in the vertical blanking interval. Of course the vertical sync pulse occurs at a frequency of about 60 Hz. If a 20 Hz tag signal is used, for example, one cycle of the tag signal will occur every three vertical sync pulses. If a 3 Hz tag signal is used, one cycle of the tag signal will occur every twenty vertical sync pulses. The tag modulation will affect the amplitude of the vertical sync pulses, but need not modulate the amplitude of the vertical sync pulses too deeply, for example, more than a few dB, in order to be detected by the tag detection equipment. Of course, there must be some way for the STT or receiver to recover the vertical sync pulse, however much it is attenuated by tagging, in order to produce an acceptable display on the receiver. Analysis of the amplitude of the vertical sync pulses over several fields, with about sixty fields occurring each second, makes determination of whether the vertical sync pulses being received are modulated at such a tag frequency fairly straightforward. For example, a bandpass filter having a narrow, sharply delineated passband centered on the tag frequency, can be used to detect the tag and thus provide a determination whether vertical sync pulses in the video being received by a leakage detector are in the tagged channel. If they are, the source of the leakage has, of course, been identified.

A CATV system 8 according to the present invention is illustrated in highly schematic block diagram form in FIG. 1. Several program sources 10, 12, 14, . . . 16, 18 such as satellite links, VCR's and the like at a head end 19 of the CATV system 8 are coupled to input ports of respective modulators 20, 22, 24, . . . 26, 28. The modulators modulate the source signals into channels for placement on a CATV circuit 30. The output ports of channel modulators 20, 22, 24, . . . 26 are coupled through respective power couplers 32, 34, 36, . . . 38 to circuit 30. The output port of an arbitrary one, 28, of the channel modulators, however, is selectively coupled by a switching network 124, 126 to an input port of a variable attenuator, or amplitude modulator, 120. A low (here, subsonic) frequency oscillator 121 has an output port 123 on which appears a subsonic frequency signal in the range of, for example, 3 Hz–35 Hz. This signal is coupled from port 123 to a control input port 125 of amplitude modulator 120. The percentage modulation produced by amplitude modulator 120 in the output signal from modulator 28 is very low, typically only about 3 dB or so of modulation of the source 18 signal applied to circuit 30.

The detection of the oscillator 121 frequency in circuit 30 can best be understood by first assuming that circuit 30 contains a leak 156, illustrated as an antenna for purposes which will become clear, along its length nearer head end 19 and a leak 158 along its length more remote from head end 19. Leaks 156, 158 typically serve both as radiators for the egress of RF energy from CATV system 8 and as receivers for the ingress of energy into CATV system 8. Thus it is important to identify and locate such leaks 156, 158 not only because the RF energy which would otherwise be available to subscribers 152, . . . 154 can escape the circuit 30 but also because RF signals of all kinds from all kinds of extraneous sources such as broadcast, two-way radio and so on are constantly impinging upon circuit 30.

Figure 2:
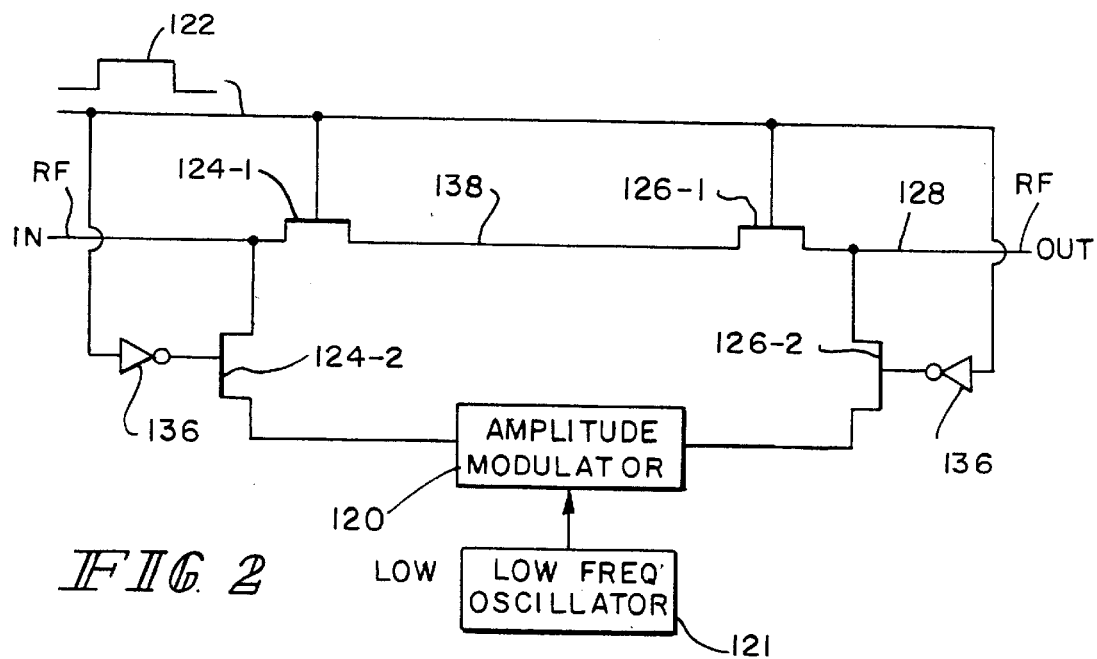
FIG. 2 illustrates a partly block and partly schematic diagram of a detail of the system illustrated in FIG. 1.

Tag modulation is provided by amplitude modulator 120, for example, a PIN diode attenuator, during the vertical blanking interval by using the vertical sync pulses 122 to control two switches 124, 126 associated with the modulator 120. One, 124, of the switches steers the video signal either through the modulator 120 or around it unmodulated and on conductor 128 out into the circuit 30, and the other, 126, of the switches steers the tag-modulated signal back to the conductor 128 which carries the channel downstream in the circuit 30 to subscribers 52, . . . 54. Referring to FIG. 1, vertical sync 122 is detected 134, for example, by a sync detector. The detected vertical sync 122 is coupled to, for example, the gate electrodes of four high-speed FET switches 124-1, 124-2, 126-1 and 126-2. See FIG. 2. FETs 124-2 and 126-2 may be of opposite type to FETs 124-1 and 126-1, or the vertical sync 122 can be inverted 136 before it is coupled to the gates of FETs 124-2 and 126-2. The objective, of course, is to have the main current conducting paths, drain-to-source or source-to-drain, of FETs 124-1 and 126-1 conducting at all times other than during the vertical blanking interval, and to have the main current conducting paths of FETs 124-2 and 126-2 conducting only during the vertical blanking interval. In this way, the modulator 120 is taken out of the circuit 30 at all times other than during the vertical blanking interval, and the bypass 138 is taken out of the circuit 30, and the modulator 120 placed in the circuit 30 during the vertical blanking interval. The video signal, for example, modulated on a CATV channel carrier, is coupled to, for example, the drains of FET switches 124-1 and 124-2. Terminals, for example, the drains, of FET switches 126-1 and 126-2 are coupled to conductor 128.

Figure 3A:
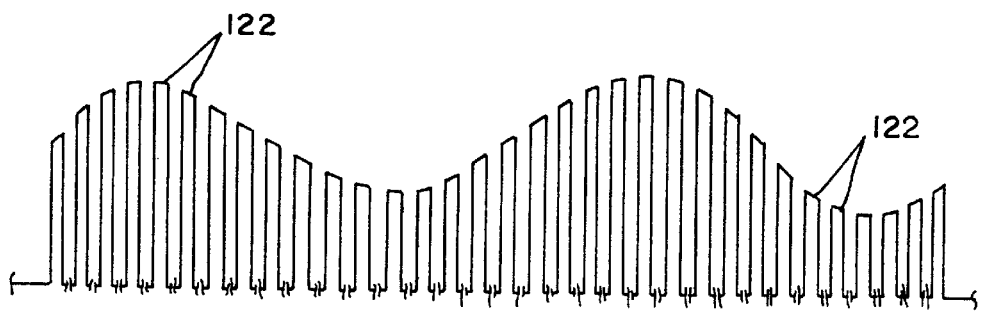
FIGS. 3a–b illustrate waveforms useful in understanding the invention.
Figure 3B:
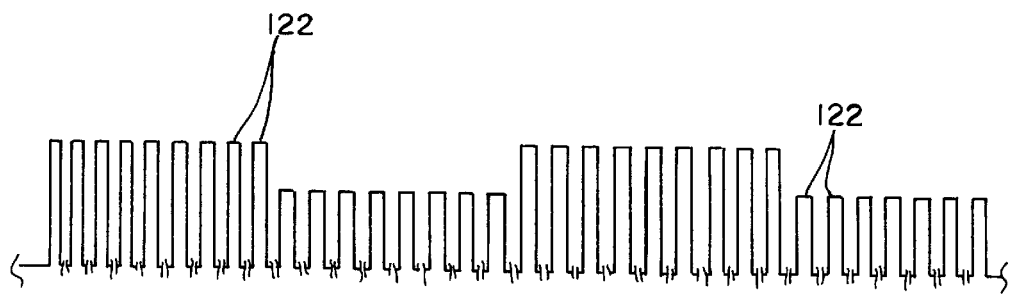

What is put on the circuit 30 in the channel of which modulator 28 is the modulator and channel carrier oscillator 160 is the channel carrier oscillator can best be understood by reference to FIGS. 3a–b. In FIGS. 3a–b, for the purpose of clarity, what is between each pair of vertical sync pulses 122, namely, the 262 horizontal sync pulses and the approximately 262½ lines of video, has been deleted. (Again, it must be remembered that all that passes through modulator 120 is the vertical sync pulses, owing to the switching of switches 124 and 126 being controlled by the detected vertical sync pulses.) All that is illustrated is the train of vertical sync pulses 122 themselves. What is illustrated are thirty-three vertical sync pulses, roughly half a second's worth. The depth of modulation of the vertical sync pulse 122 train is somewhat exaggerated to illustrate the invention. In FIG. 3a, the illustrated tag frequency is roughly 4 Hz and the modulating signal is a sinusoid. It should further be clear from this discussion that the modulating signal need not be an analog signal, such as the illustrated sinusoidal wave, at all. The modulation may, for example, be alternating unmodulated and modulated vertical sync pulses 122, or some arbitrary number, for example, one, unmodulated vertical sync pulse 122, followed by some arbitrary number, for example, one, vertical sync pulse 122 modulated to a depth of, for example, 3 dB. Such a modulation scheme is illustrated in FIG. 3b. Again, the illustrated tag frequency is roughly 4 Hz, and the depth of modulation of the vertical sync pulse 122 train is somewhat exaggerated to illustrate the invention. Nor is it essential to avoid frequencies up in the bandwidth of the television receivers tuned to the tagged channel. For example, a 2.5 KHz burst, a 500 KHz burst, or the like can be inserted into, for example, a 200 μsec. window during the vertical blanking interval in a location which does not affect the ability of the vertical oscillators of television receivers tuned to the tagged channel to synchronize to the vertical sync pulse.

Figure 4:
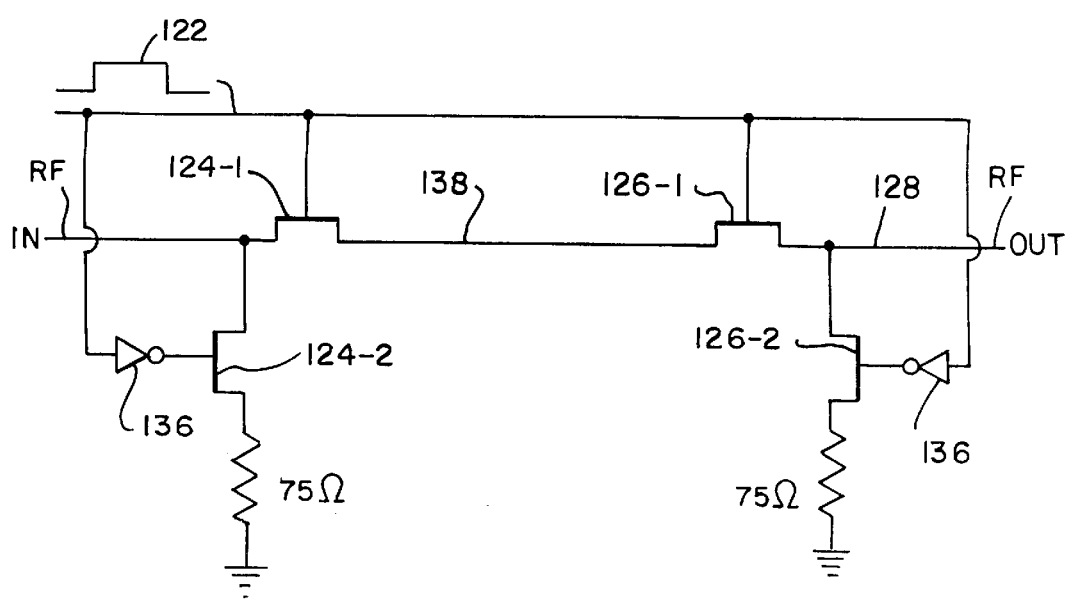
FIG. 4 illustrates a partly block and partly schematic diagram of a detail of another embodiment of the system.

In another embodiment of the invention, illustrated in FIG. 4, the modulation during a portion of the vertical blanking interval is essentially complete. That is, the RF signal is substantially completely attenuated during some portion of the vertical blanking interval. As long as a sufficient portion of the vertical sync pulse remains unaffected to lock the vertical oscillators of television receivers tuned to the tagged channel, it makes little difference that some portion of the vertical blanking interval is substantially completely attenuated. Since there are, in the NTSC format, approximately 60 vertical blanking intervals every second, if the system operator wants to tag at, for example, 10 Hz, some portion, for example, 200 μsec. or so, of roughly every sixth vertical blanking interval (10×6=60) can be attenuated by an amount permitting detection. If the system operator wants to tag at 15 Hz, some portion of roughly every fourth vertical blanking interval (15×4=60) can be attenuated by an amount permitting detection. If the system operator wants to tag at 20 Hz, some portion of roughly every third vertical blanking interval (20×3=60) can be attenuated by an amount permitting detection. If the system operator wants to tag at 30 Hz, some portion of every other vertical blanking interval (30×2=60) can be attenuated by an amount permitting detection, and so on.

In another embodiment of the invention illustrated in FIG. 5, the carrier $f_{cn}$ of a channel n to be tagged, modulated by the information to be transmitted in channel n, is coupled to one input port 200 of a combiner 202. The baseband video for channel n is coupled to a sync separator 204. The sync for channel n is coupled from the sync separator 204 to a pulse circuit 206 which generates a short duration, for example, 50 μsec., pulse 208 during each, or every other, or every third, or the like, vertical sync pulse 210 of the separated sync 212. Generating such a pulse 208 during every third vertical sync pulse 210 has been demonstrated to be an effective strategy for several reasons, including the reason that power line frequency disturbances at 60 Hz do not appear to be as likely to alias the detection equipment.

In any event, pulse 208 actuates a switch 214 between another signal source 216 and another input port 218 of the signal combiner 202. What results at the output port 220 of the signal combiner 202 is channel n plus a pulse 208-duration burst of the output from signal source 216 during every sync pulse 210, or every other sync pulse 210, or every third vertical sync pulse 210, or the like. Signal source 216 may provide practically any desired signal, for example, a signal having a frequency $f_{cT}$ near the lower end 222 of the channel n frequency band, perhaps modulated by a signal having a frequency $f_m$ in the 1 KHz–10 KHz range. The frequency modulated carrier frequency $f_m \times f_{cT}$ lies below $f_n$, the frequency of the channel n carrier, and above the audio carrier 224 of the next adjacent lower channel (n−1).

Figure 6A:
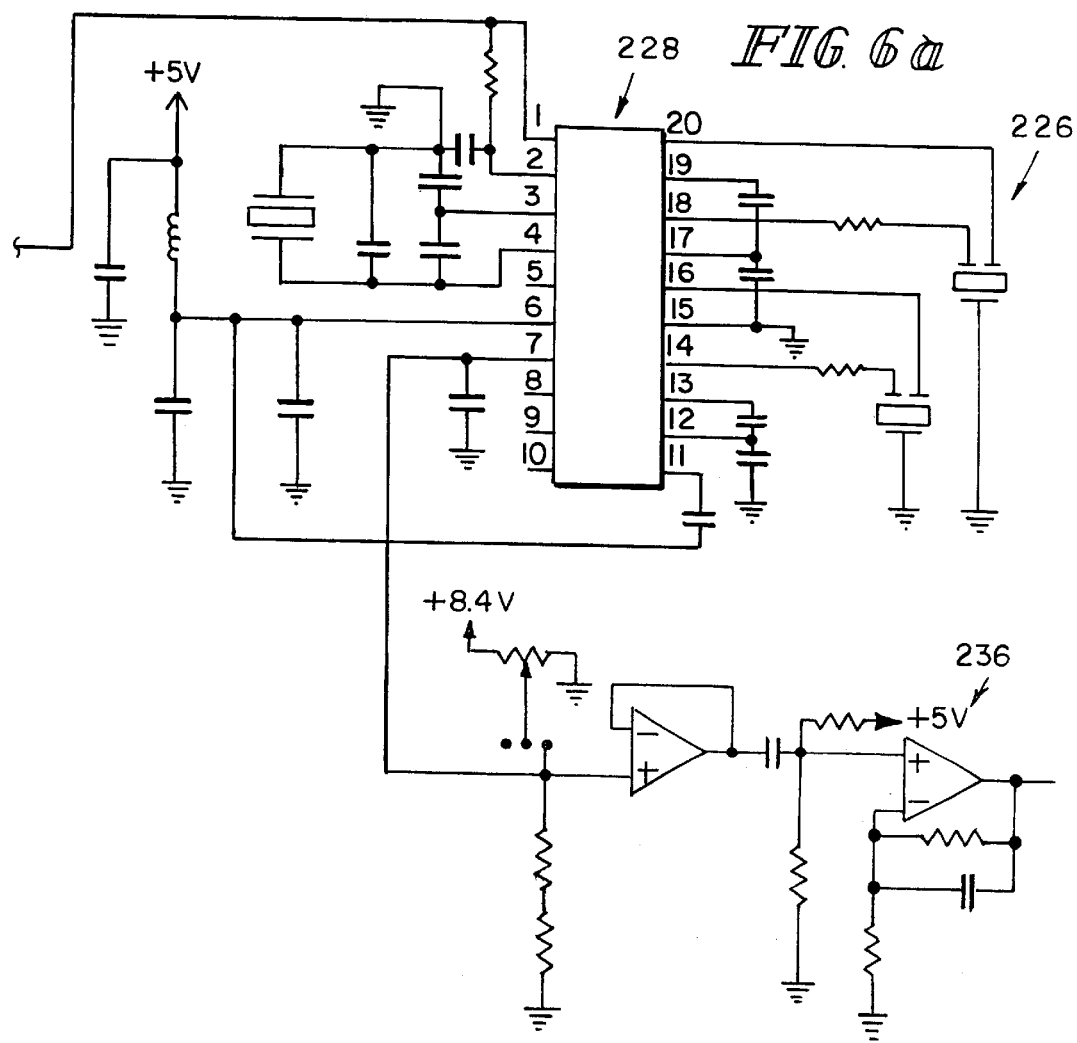
FIGS. 6a–b illustrate partly block and partly schematic diagrams of details of another system constructed according to the invention.
Figure 6B:
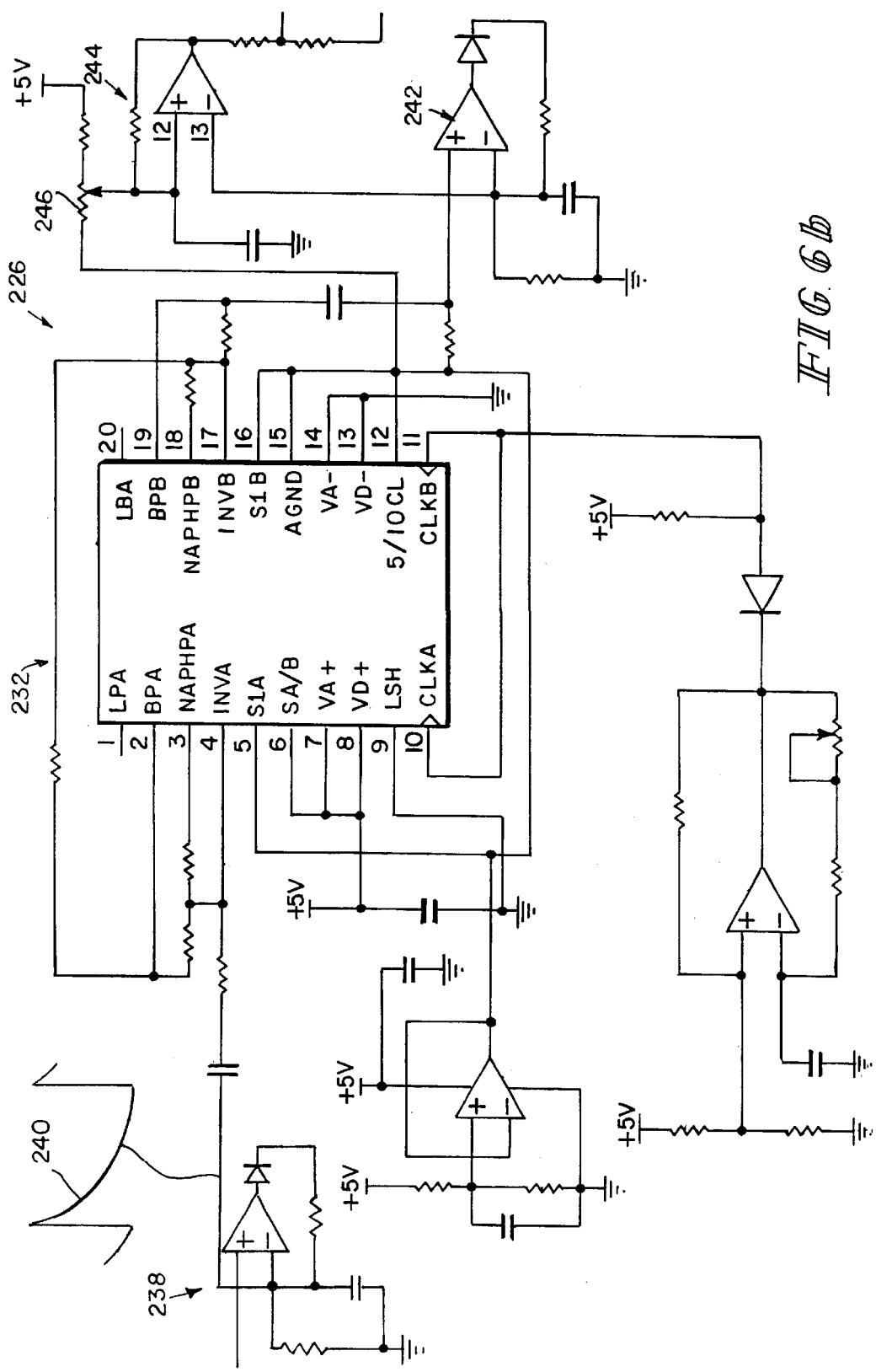

In order to detect this signal to determine whether the detected leakage is coming from the tagged channel n, an instrument 226 such as the Trilithic, Inc., model SuperPlus leakage detection instrument is modified as illustrated in FIGS. 6a–b. Such an instrument 226 is generally as described in U.S. Pat. No. 5,608,428. In such an instrument 226, the output signal from a receiver 228 is coupled to a switched capacitor filter 232 for further application to the instrument 226's squelch circuit to control the breaking of squelch. According to the present invention, an additional peak detection circuit 238 is coupled between an amplifier 236 in the receiver circuitry 228 and the switched capacitor filter 232. The peak detector 238 expands each pulse out, as illustrated at 240, and provides the train of expanded pulses 240 to the switched capacitor filter 232. The output of the switched capacitor filter 232 is then peak detected again, as illustrated at 242, as in U.S. Pat. No. 5,608,428, and compared 244 to a squelch threshold 246 to control the breaking of squelch. Breaking squelch indicates that a signal having the center frequency $f_m$ of the switched capacitor filter 232 has been received, which in turn, is indicative that a leak of the tagged channel n has been received by the instrument 226.

Figure 7:
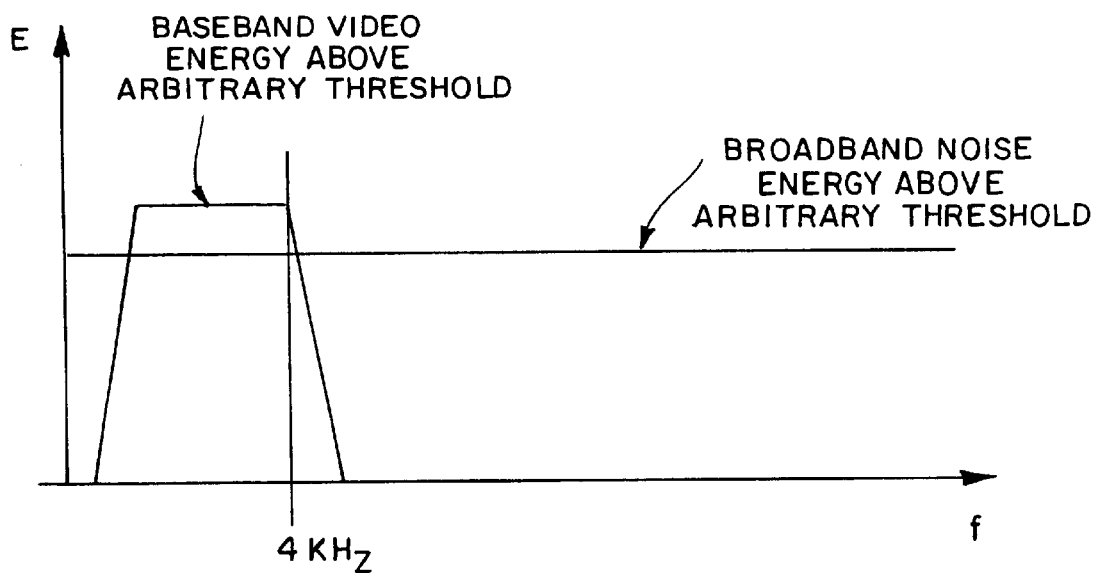
FIG. 7 illustrates a concept useful in understanding another embodiment of the invention; and, FIG. 8 illustrates a partly block and partly schematic diagram of another embodiment of the invention.

Referring now to FIG. 7, in another embodiment of the invention which may be used independently of, or in conjunction with, other leakage detection schemes, it first needs to be recognized that a considerable amount of the energy contained in baseband video appears in the DC to 4 KHz or so frequency range, owing in large measure to the existence of the vertical sync pulses and other low frequency phenomena in baseband video. Noise from most sources encountered in the environment, on the other hand, tends to be more broadband. Thus, if a scheme is implemented to detect a signal in the environment surrounding a CATV system, and that scheme detects signals having a preponderance of their energy at frequencies greater than, for example, 5 KHz, the odds are greater that those signals are not baseband video, and thus, are not the result of a channel leaking from the CATV system. On the other hand, if the scheme detects signals having a preponderance of their energy at frequencies less than some arbitrarily lower frequency, say 2 KHz or 3 KHz or 4 KHz, then the odds are greater that those signals are baseband video, and thus are the result of a channel leaking from the CATV system. One way such a system can be implemented is illustrated in FIG. 8.

Figure 8:
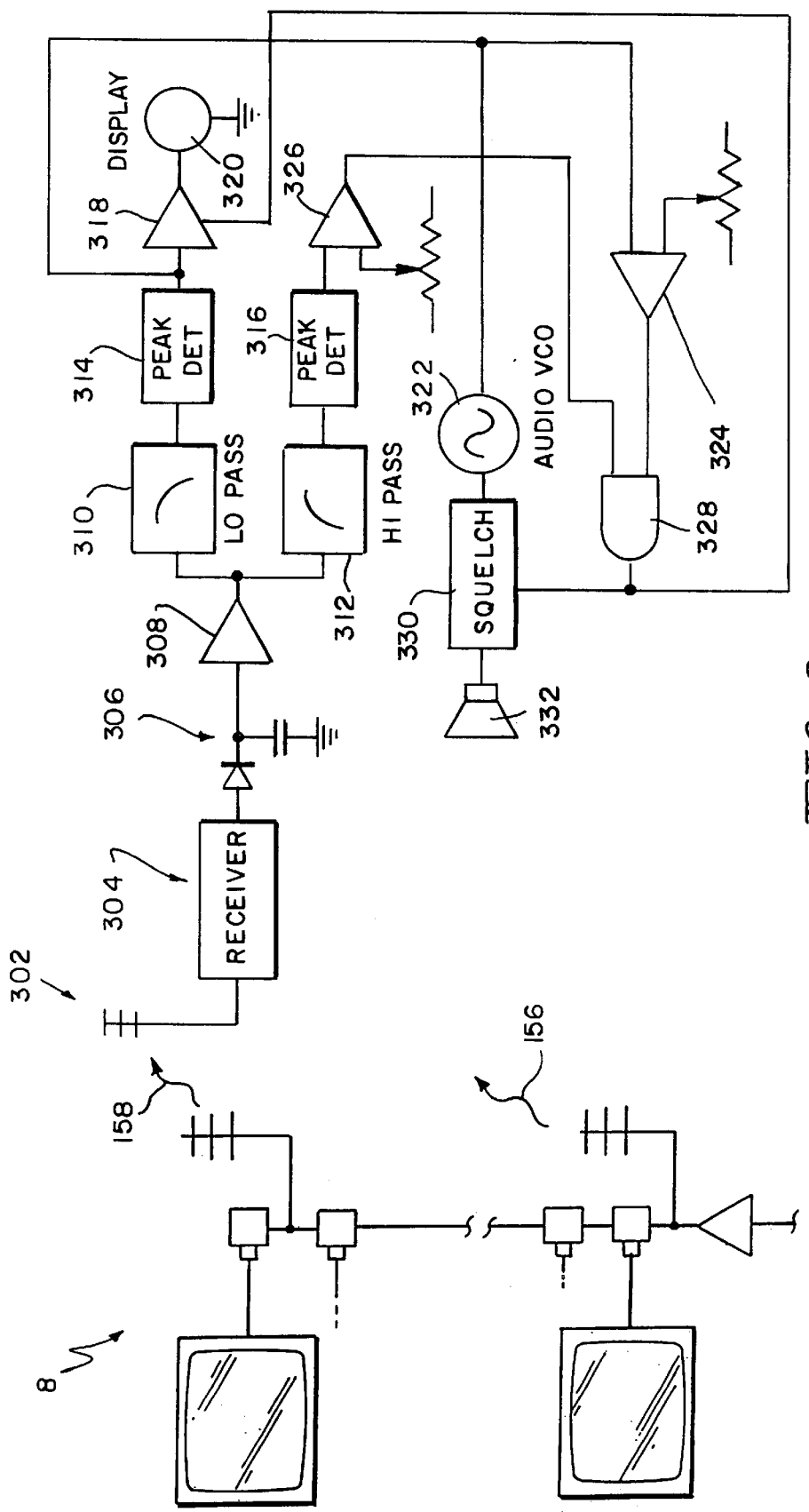

In FIG. 8, CATV signals leaking 156, 158 from a CATV system 8 are received by an antenna 302 which is coupled to a receiver 304 including an RF section and an IF section. An output of the IF section is demodulated by tuning to, for example, the carrier frequency of one of the channels being carried by the CATV system 8, so that, if that channel is leaking from the CATV system 8 and is received by the antenna 302, baseband video will be output from the IF section of the receiver 304. The baseband video is detected by a detector circuit 306, buffered by a buffer amplifier 308, and split into two signal paths, one including a low pass filter (LPF) 310, and the other including a high pass filter (HPF) 312. Output signals from both LPF 310 and HPF 312 are peak detected, 314 and 316, respectively. Illustratively, the output signal from LPF 310 can be further processed, for example, by amplification by a display driver 318 or buffering or the like, and used to generate, for example, a display 320 of the strength of a received CATV channel.

An output port of peak detector 314 is also coupled to an audio frequency voltage controlled oscillator (VCO) 322 and to an input port of a comparator 324. An output port of peak detector 316 is coupled to an input port of a comparator 326. Additional input ports of comparators 324, 326 are coupled to respective sources, for example, potentiometers, of DC voltages to permit the setting of thresholds above which the operator of the equipment desires the compared signals to trigger output signals. Output ports of both comparators 324, 326 are coupled to input ports of an AND gate 328. An output port of AND gate 328 is coupled to a control input port of a squelch circuit 330 and to a control input port of driver 318. An output port of VCO 322 is coupled to another input port of squelch circuit 330. An output port of squelch circuit 330 is coupled to a loudspeaker 332.

Let a signal having a strength of, for example, 2 $\mu$V/m (about −113 dBm across the output terminals of a 50Ω dipole) be received by a receiver 304 having a 15 KHz IF bandwidth and tuned to, for example, 133 MHz. The content of the 15 KHz passband is filtered by the LPF 310 and HPF 312 having corner frequencies of, for example, 2 KHz and 4 KHz, respectively. The output of LPF 310 is peak detected 314 and used to drive 318 display 320 under the control of AND gate 328 to indicate the strength of the received channel. The state of the output of comparator 324 changes from 0 to 1 when the energy content of the received signal below 2 KHz exceeds comparator 324's set threshold. The state of the output of comparator 326 changes from 0 to 1 when the energy content of the received signal above 4 KHz does not exceed comparator 326's set threshold. This combination of logical conditions produces at the output of AND gate 328 a logic 1 condition, which, in turn, triggers the display driver 318 and breaks squelch in circuit 330, permitting the VCO 322 output to be transduced by loudspeaker 332. The output frequency of VCO 322 changes in relation to the energy content in the DC to 2 KHz bandwidth, and thus provides an audible indication of the magnitude of the received CATV channel leakage.

The LPF does not need to have an upper corner frequency of 2 KHz, nor the HPF a lower corner frequency of 4 KHz. These are illustrative. For example, a considerable amount of the energy contained in baseband video is contained in the vertical sync 122 at about 60 Hz. Thus, with appropriate adjustment of the DC voltages on the comparison input ports of comparators 324 and 326, an upper corner frequency of, for example, 100 Hz, for LPF and a lower corner frequency of, for example, 1 KHz, for HPF could be useful.

What is claimed is:

1. In a communication circuit which carries at least a first signal including frequencies in at least a first frequency band, the circuit located in an environment wherein a second signal includes frequencies in at least a second frequency band not including frequencies in the first frequency band, a method of determining whether the first signal is escaping from the circuit including transporting along the circuit apparatus adapted for receiving the first signal, detecting whether a received signal includes frequencies in the first frequency band, detecting whether a received signal includes frequencies in the second frequency band, comparing the magnitude of received frequencies in the first frequency band to the magnitude of received frequencies in the second frequency band, and producing an indication of the relationship of the magnitude of received frequencies in the first frequency band to the magnitude of received frequencies in the second frequency band.

2. The method of claim 1 further including producing an indication that the received signal includes frequencies in the first frequency band.

3. The method of claim 1 wherein comparing the magnitude of received frequencies in the first frequency band to the magnitude of received frequencies in the second frequency band and producing an indication of the relationship of the magnitude of received frequencies in the first frequency band to the magnitude of received frequencies in the second frequency band together include comparing the magnitude of received frequencies in the first frequency band to a first desired threshold and producing a third signal based upon this comparison, comparing the magnitude of received frequencies in the second frequency band to a second desired threshold and producing a fourth signal based upon this comparison, and combining the third and fourth signals to produce the indication of the relationship of the magnitude of received frequencies in the first frequency band to the magnitude of received frequencies in the second frequency band.

4. In a communication circuit which carries at least a first signal including frequencies in at least a first frequency band and a second signal including frequencies in at least a second frequency band not including frequencies in the first frequency band, a detector for transporting along the circuit for determining whether the first signal is escaping from the circuit, the detector adapted for receiving the first signal and the second signal, detecting whether a received signal includes frequencies in the first frequency band and the second frequency band, comparing the magnitude of received frequencies in the first frequency band to the magnitude of received frequencies in the second frequency band, and producing an indication of the relationship of the magnitude of received frequencies in the first frequency band to the magnitude of received frequencies in the second frequency band.

5. The detector of claim 4 further adapted for producing an indication that the received signal includes frequencies in the first frequency band.

6. The apparatus of claim 4 wherein the detector for comparing the magnitude of received frequencies in the first frequency band to the magnitude of received frequencies in the second frequency band and producing an indication of the relationship of the magnitude of received frequencies in the first frequency band to the magnitude of received frequencies in the second frequency band together include comparing the magnitude of received frequencies in the first frequency band to a first desired threshold and producing a third signal based upon this comparison, comparing the magnitude of received frequencies in the second frequency band to a second desired threshold and producing a fourth signal based upon this comparison, and combining the third and fourth signals to produce the indication of the relationship of the magnitude of received frequencies in the first frequency band to the magnitude of received frequencies in the second frequency band.

* * * * *